US012698363B1

(12) United States Patent
Laos et al.

(10) Patent No.: US 12,698,363 B1

(45) Date of Patent: Aug. 4, 2026

(54) COMPOSITIONS OF FLUORINATED FLUIDS AND FLUORINATED SURFACTANTS WITH DENSITIES NEAR UNITY

(71) Applicants: Roberto Laos, Gainesville, FL (US); Steven Benner, Gainesville, FL (US)

(72) Inventors: Roberto Laos, Gainesville, FL (US); Steven Benner, Gainesville, FL (US)

( * ) Notice: Subject to any disclaimer, the term of this patent is extended or adjusted under 35 U.S.C. 154(b) by 568 days.

(21) Appl. No.: 17/835,289

(22) Filed: Jun. 8, 2022

Related U.S. Application Data

(63) Continuation-in-part of application No. 17/007,488, filed on Aug. 31, 2020, now abandoned.

(51) Int. Cl.

*C08G 77/24* (2006.01)
*C08L 83/08* (2006.01)
*C09K 23/00* (2022.01)

(52) U.S. Cl.

CPC ............ *C08G 77/24* (2013.01); *C09K 23/007* (2022.01)

(58) Field of Classification Search

CPC ........ C08G 77/24; C08L 83/08; C09D 183/08
USPC ............................................................ 528/42
See application file for complete search history.

(56) References Cited

PUBLICATIONS

Machine translation of JP 2018-188562 into English (no date).*
"A Review of Poly9(3,3,3-trifluoropropyl)methylsiloxane]: Synthesis, Properties, and Applications" authored by Yang et al. and published in the European Polymer Journal (2022) 163, 110903.*

* cited by examiner

*Primary Examiner* — Marc S Zimmer

(57) ABSTRACT

This invention provides combinations of fluorinated oils and fluorinated surfactants that have densities of approximately unity (1.0±0.1 kg/liter), where the combination allows the surfactant to dissolve (at least) to 1-2% level (by volume) in the oil.

4 Claims, 19 Drawing Sheets

Figure 1:
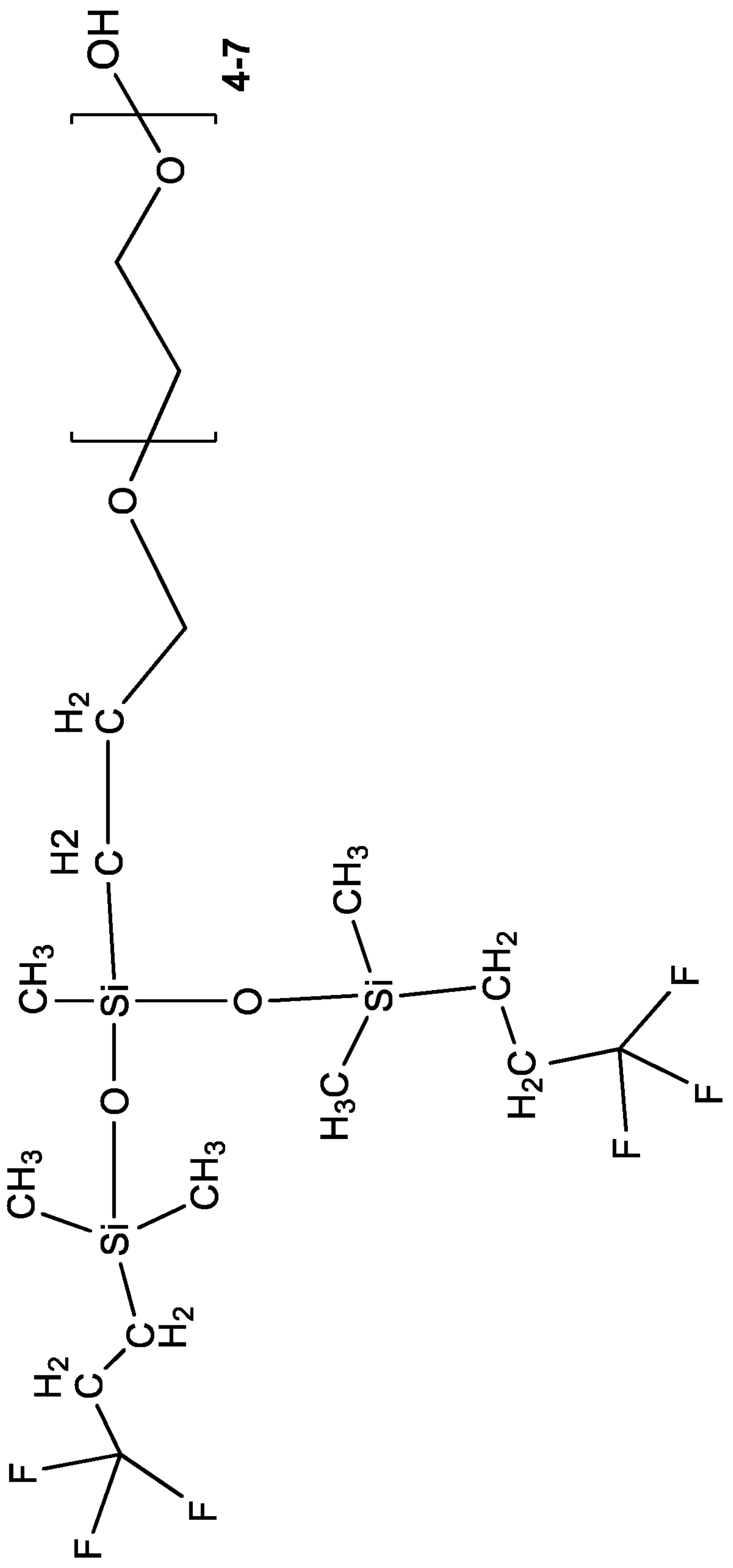

Specification includes a Sequence Listing.

A

B

C

C

COMPOSITIONS OF FLUORINATED FLUIDS AND FLUORINATED SURFACTANTS WITH DENSITIES NEAR UNITY

CROSS REFERENCE TO RELATED APPLICATIONS

This application is a continuation-in-part of U.S. patent application Ser. No. 17/007,488, filed 31 Aug. 2020, entitled "Compositions Comprising Fluorinated Fluids with Densities near Unity". This application claims the benefit of U.S. patent application Ser. No. 17/007,488.

STATEMENT OF RIGHTS TO INVENTIONS MADE UNDER FEDERALLY-SPONSORED RESEARCH

This invention was made with government support under grant 1844290 awarded by the National Science Foundation. The government has certain rights in the invention.

THE NAMES OF THE PARTIES TO A JOINT RESEARCH AGREEMENT

Not applicable

INCORPORATION-BY-REFERENCE OF MATERIAL SUBMITTED ON A COMPACT DISC

None

BACKGROUND OF THE INVENTION

(1) Field of the Invention

The field of this invention is fluorinated oils, surfactants, and aqueous emulsions that are made from them.

(2) Description of Related Art

Compartments in the form of water droplets dispersed into a water-immiscible phase (an "oil") have widespread use in technology. For example, these can be prepared in microfluidics devices by controlled flow of an aqueous phase with shearing into a parallel flow of the water-immiscible hydrocarbon oil that also contains a surfactant, typically present at 1-2% (volume:volume) of the oil. As examples of their uses, water droplets in hydrocarbon oils are used to encapsulate mammalian cells [1], in the directed evolution of enzymes [2], and in vitro fertilization [3], [4], [5].

Fluorinated oils and surfactants have advantages over hydrocarbon oils. Fluorine forms a third phase that is immiscible with both water (a hydrophilic phase) and hydrocarbon (a hydrophobic phase). As natural proteins, membranes, and other biological systems exploit both hydrophilic and hydrophobic phases, a purely hydrophobic oil can disrupt biological systems, making them not usable in water droplets suspended in a hydrophobic oil. The third phase comprising fluorinated species is sufficiently "orthogonal" to both hydrophilic and hydrophobic systems as to render that third phase inert with respect to most biological molecules systems containing them [8], [9].

Water compartments can be obtained by dispersing water into many different fluorinated oils in the presence of many different fluorinated surfactants. However, for practical applications, it is desirable that the fluorinated oil has a density similar to the density of the water droplets that are dispersed into it, so that the dispersed droplets neither float nor sink. As fluorine, with an atomic mass of 19, is intrinsically denser than water, with a molecular mass of 18, such oils are difficult to create to balance $CH_2$ units (unit mass of 14, intrinsically less dense than water) with denser fluorinated units.

Further specifications that must be met for utility relate viscosity. Water itself at 25° C. has a density of approximately unity. Many fluorinated oils have higher density. For example, the FL-5 fluorinated oil from Shin-Etsu has a reported density of 0.99 [6], making it useful under a density criterion. However, it has a reported viscosity of 120 centistokes at 25° C., diminishing its utility for microfluidic applications.

A further criterion that must be met by a fluorinated oil is its ability to dissolve useful surfactants. For example, Kobayashi and Owen [7] disclosed surfactants having the structures shown in FIG. 1 and FIG. 2. To be useful, these surfactants must dissolve in the fluorinated oil to the aforementioned to 1-2%. The surfactants reported by Kobayashi and Owen do not have the needed solubility in fluorinated oil from Shin-Etsu (FL-5). The surfactants described by Kobayashi and Owen may be soluble in fluorinated oils having densities greater than 1.5 kg/L, and much greater than 1.2 kg/L.

BRIEF SUMMARY OF THE INVENTION

This invention provides combinations of fluorinated oils and fluorinated surfactants that have densities of approximately unity (1.0±0.1 kg/liter), where the combination allows the surfactant to dissolve (at least) to 1-2% level (by volume) in the oil.

BRIEF DESCRIPTION OF THE SEVERAL VIEWS OF THE DRAWING(S)

FIG. 1. Fluorinated surfactant. $Pr_f$ side chain

Figure 2:
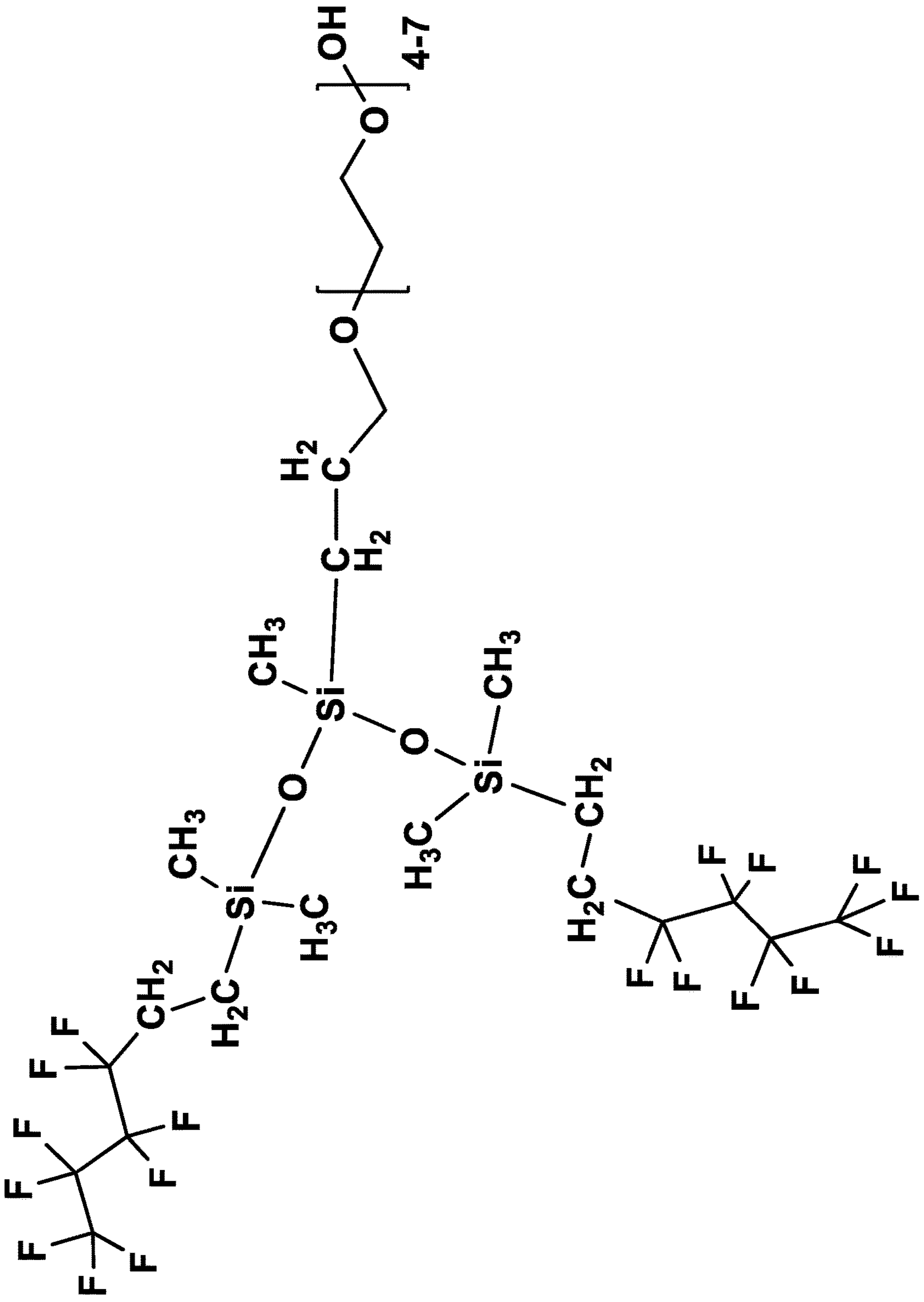

FIG. 2. Fluorinated surfactant. $Hx_f$-side chain

Figure 3:
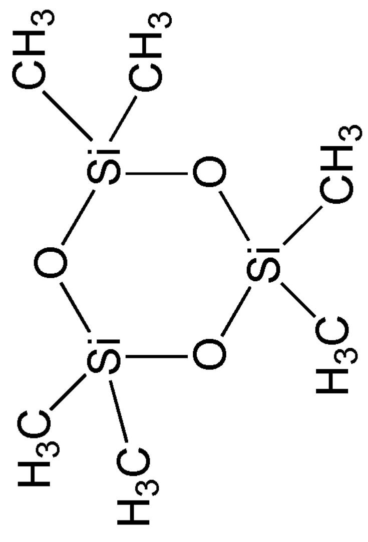
Figure 3:
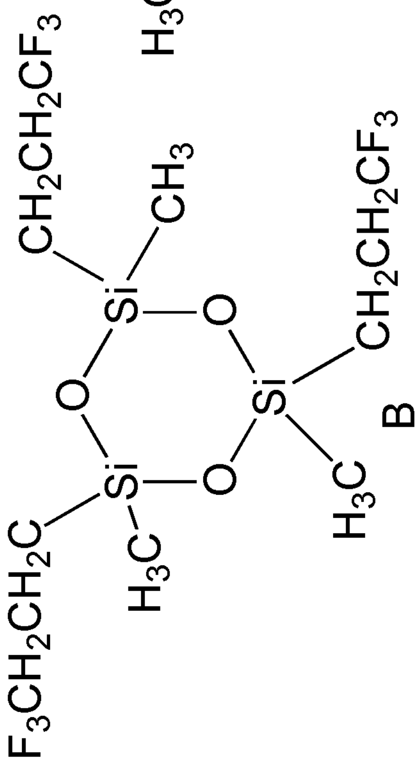
Figure 3:
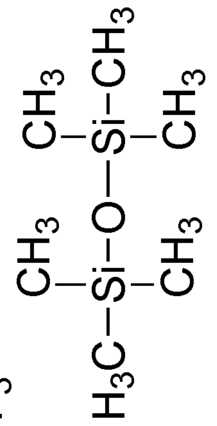

FIG. 3. Building blocks used to form the fluid.

Figure 4:
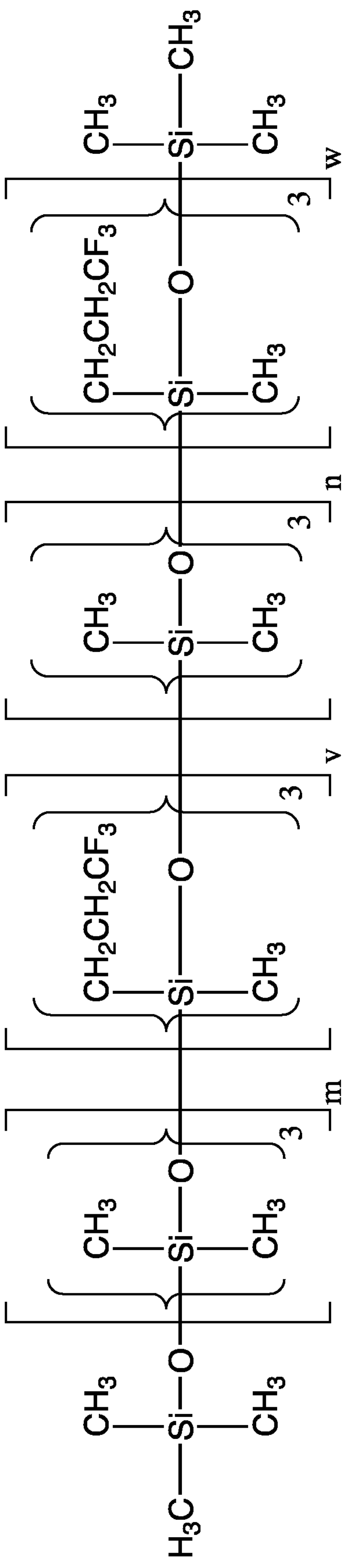

FIG. 4. The structure of a polymer that is a principal component of a fluorinated oil covered by the instant invention, the density is between 0.90 and 1.10 kg/L, and the viscosity is less than 80 centipoise, more preferably less than 70 centipoise.

Figure 5:
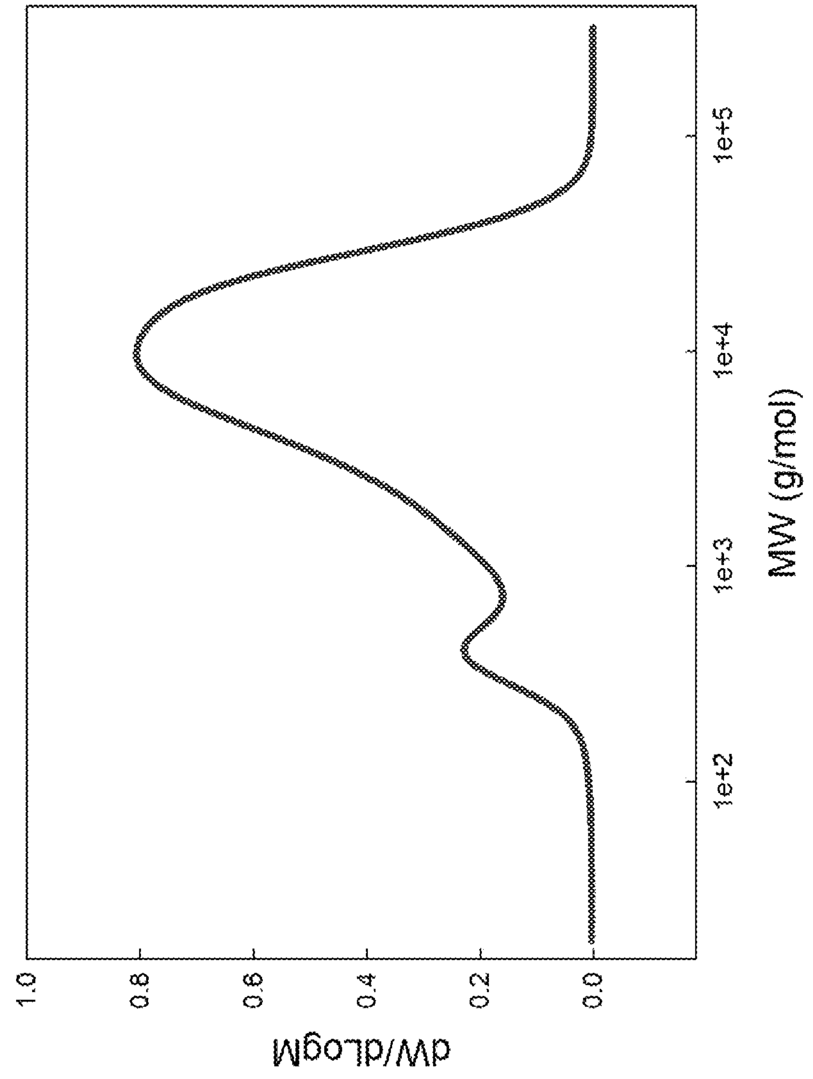
Figure 6:
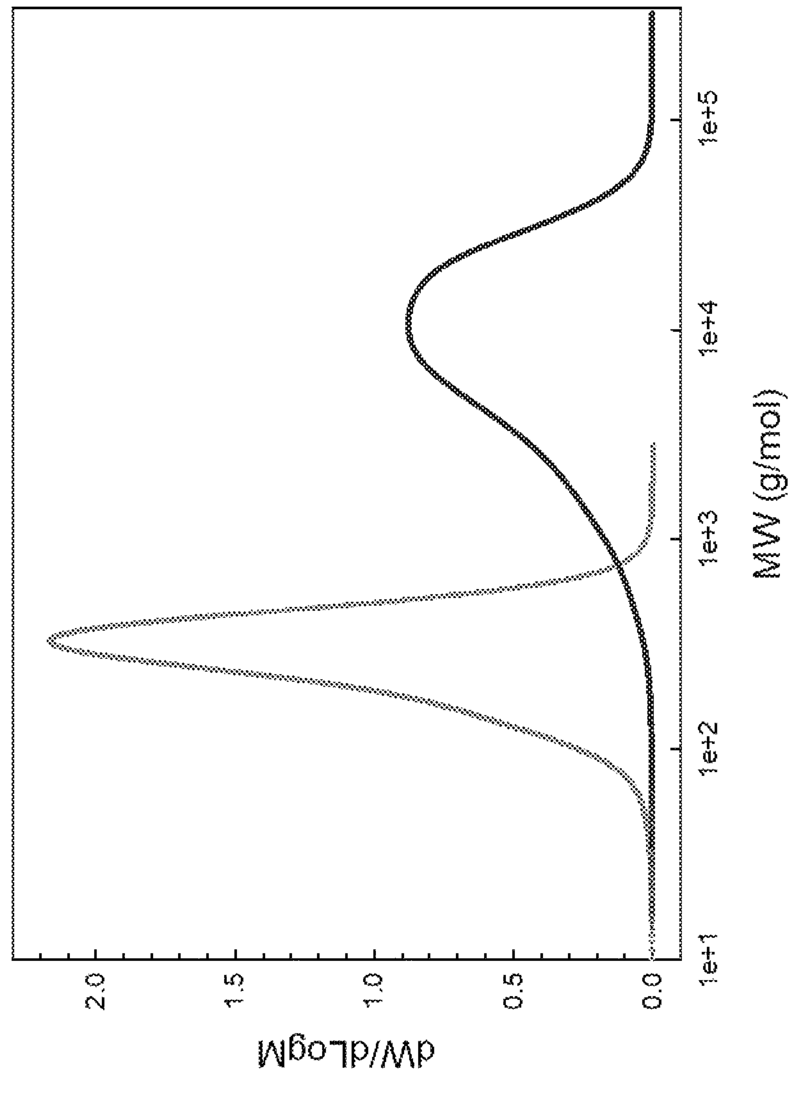

FIG. 5. Molecular weight distribution of polysiloxanes produced via Example 1. Ring-opening polymerization following Example 1 produced polysilioxanes with bimodal distribution. These two peaks can be separated by distillation under reduced pressure with a high molecular weight peak (Mp~9,400 g/mol) and a low molecular weight peak (Mp~300 g/mol). The low molecular weight fraction contains a higher concentration of fluorinated monomers estimated by $^1$H-NMR and is capable of dissolving the fluorinated surfactants. Peak 1 corresponds to the higher molecular weight peak (rightmost) and peak 2 corresponds to the lower molecular weight peak (leftmost). FIG. 6 shows an overlay of two gel permeation chromatography runs of the two distinctive fractions separated by distillation.

FIG. 6. Overlay of molecular weight distribution of the two fractions separated by distillation after ring-opening polymerization following Example 1. The fractions show both an unimodal molecular weight distribution of Mp~10320 g/mol for the high molecular weight fraction (right peak) and Mp~320 g/mol for the low molecular weight fraction (left peak).

Figure 7:
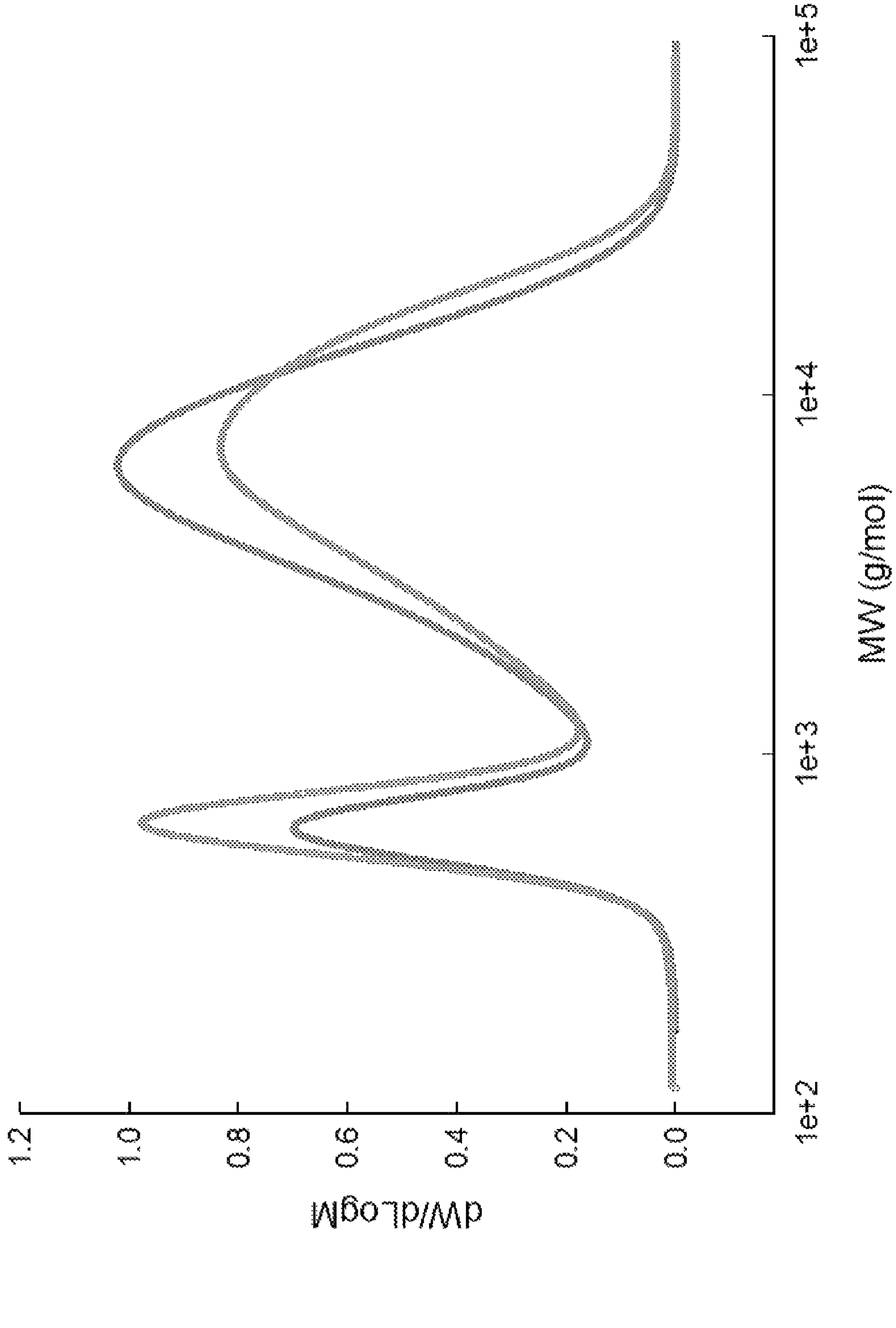

FIG. 7. Molecular weight distribution of polysiloxanes produced via Example 2. Ring-opening polymerization following Example 2 produced two liquid polysilioxanes that spontaneously separate in two phases with different densities and are referred as fluid C (lower on the left, higher on the right) and fluid D (higher on the left, lower on the right). Each fluid exhibits bimodal molecular weight distribution.

Figure 8A:
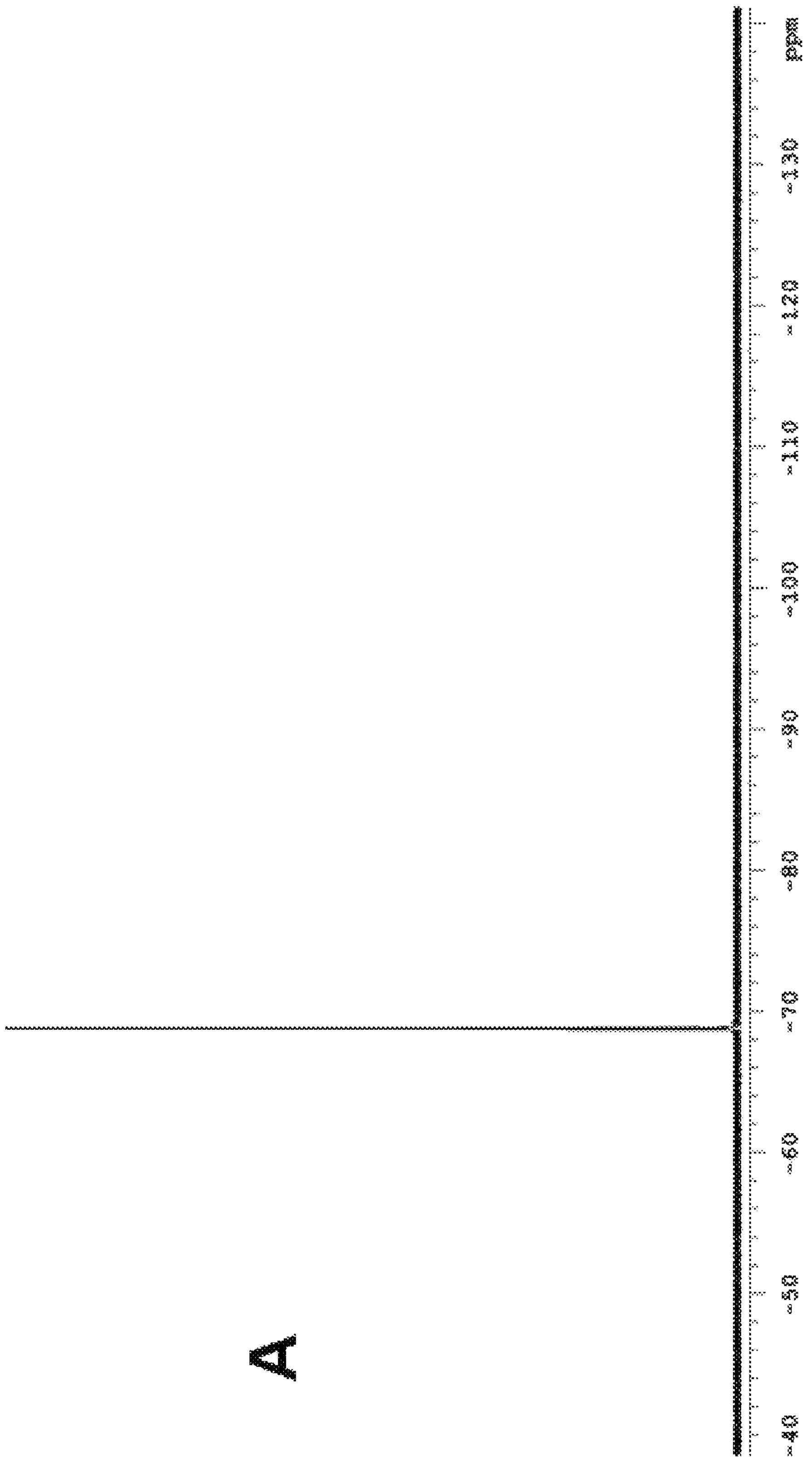

FIG. 8A. $^{19}$F-NMR overlays showing the presence of the surfactant with the $Hx_f$ hydrophobe $CF_3CF_2CF_2CF_2CH_2CH_2$— dissolved in the low molecular weight fluid (Fluid B). A single peak that comes from the $CF_3CH_2CH_2$— from the fluorinated fluid.

Figure 8B:
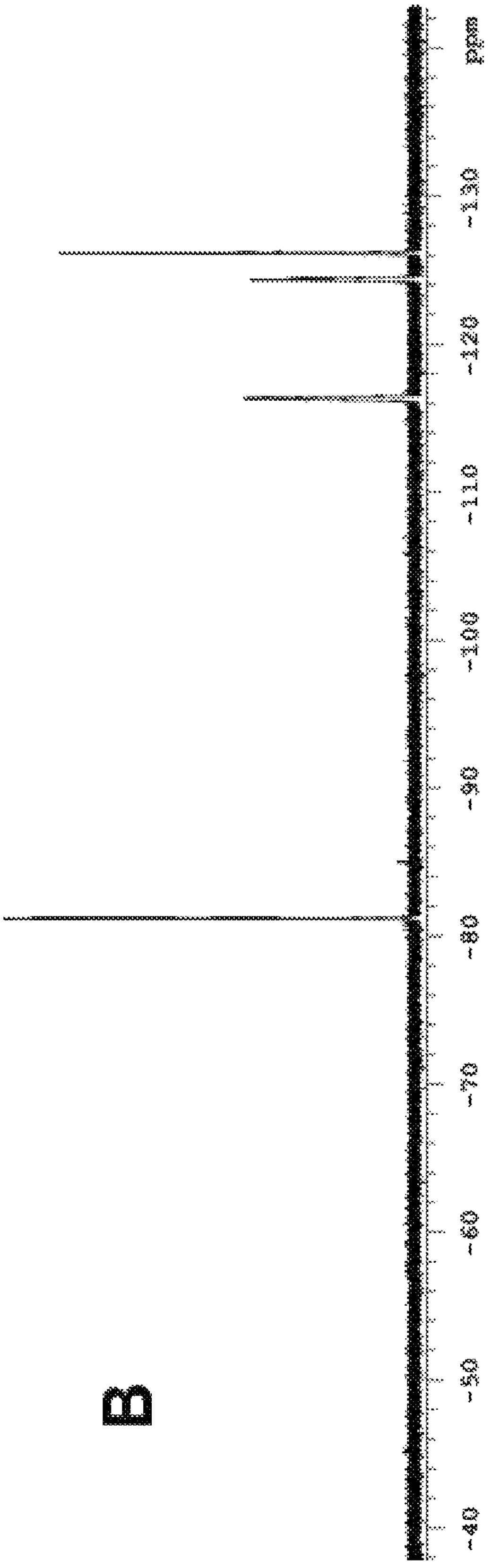

FIG. 8B. Four peaks that correspond to the fluorine of the $Hx_f$ hydrophobe $CF_3CF_2CF_2CF_2CH_2CH_2$—.

Figure 8C:
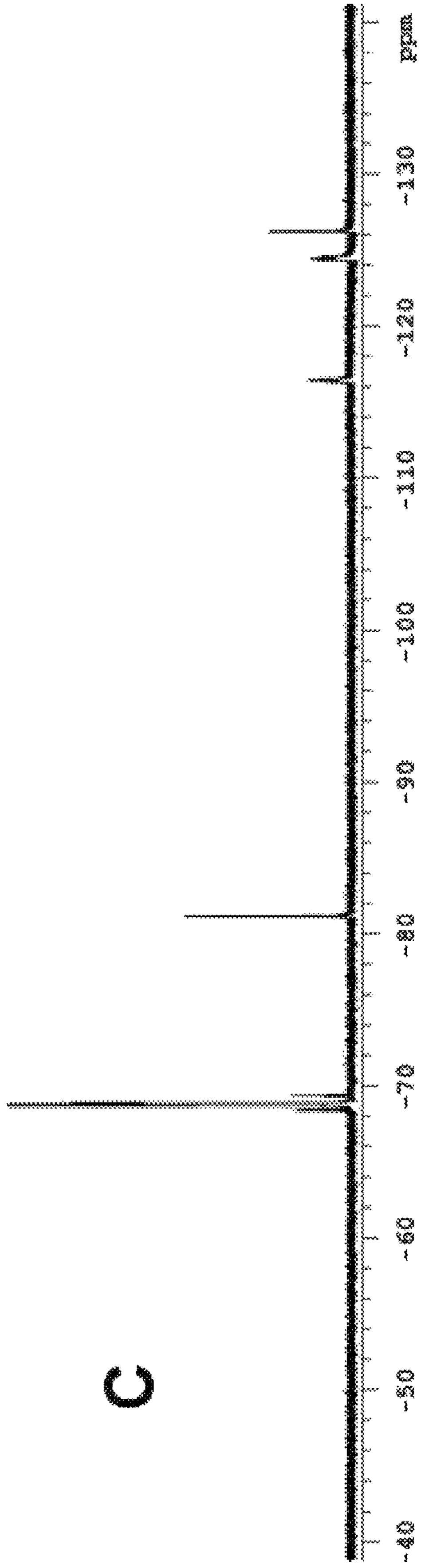

FIG. 8C. $^{19}$FNMR of a homogeneous 4% solution (v/v) of the surfactant in the fluorinated fluid exhibiting the signals from both components.

Figure 9A:
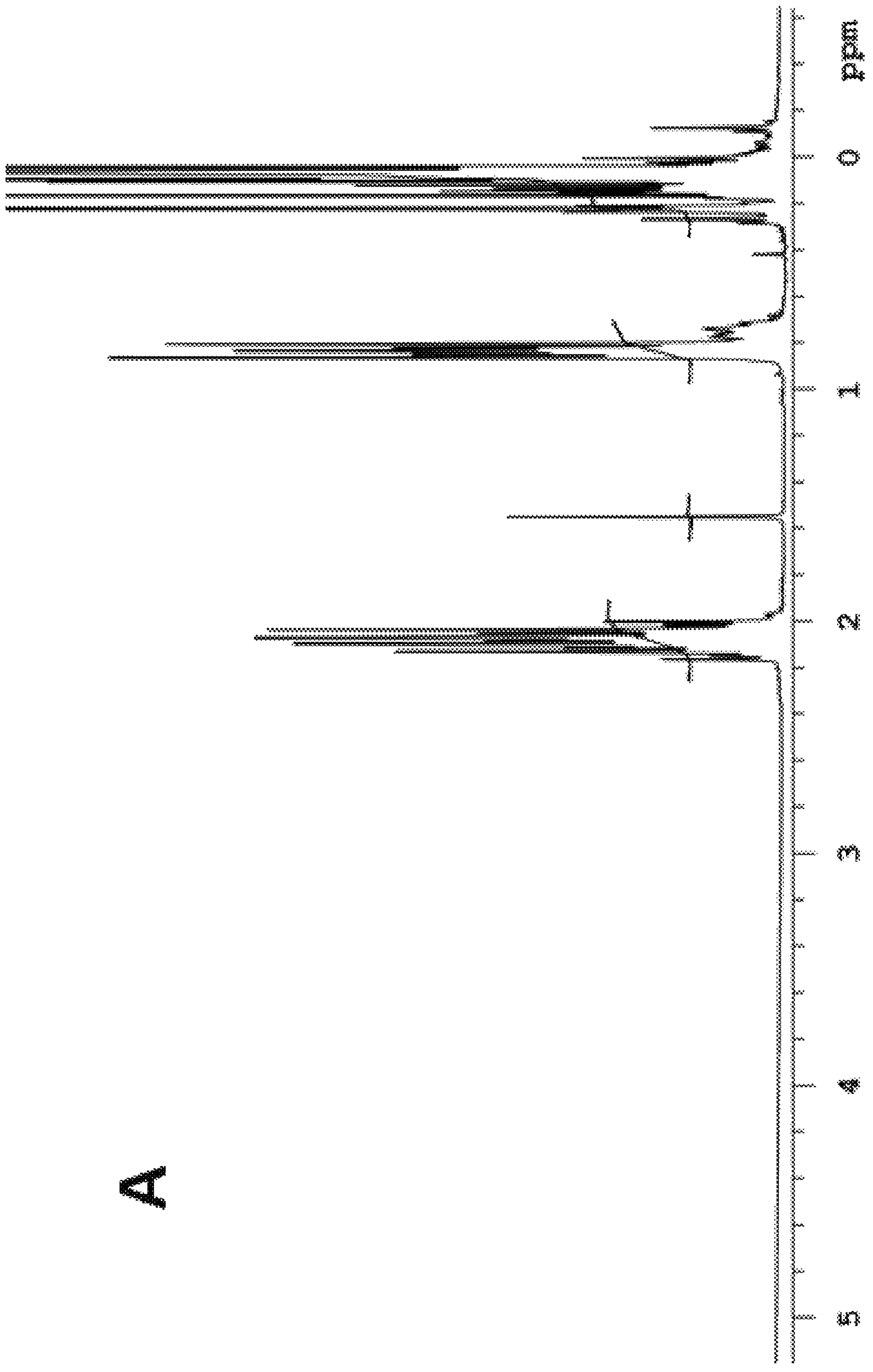

FIG. 9A. $^{1}$HNMR overlays showing the presence of the surfactant (FIG. 1) with the $Pr_f$ hydrophobe $CF_3CH_2CH_2$— dissolved in the low molecular weight fluid (Fluid B). (A) $^{1}$HNMR of the fluid without surfactant.

Figure 9B:
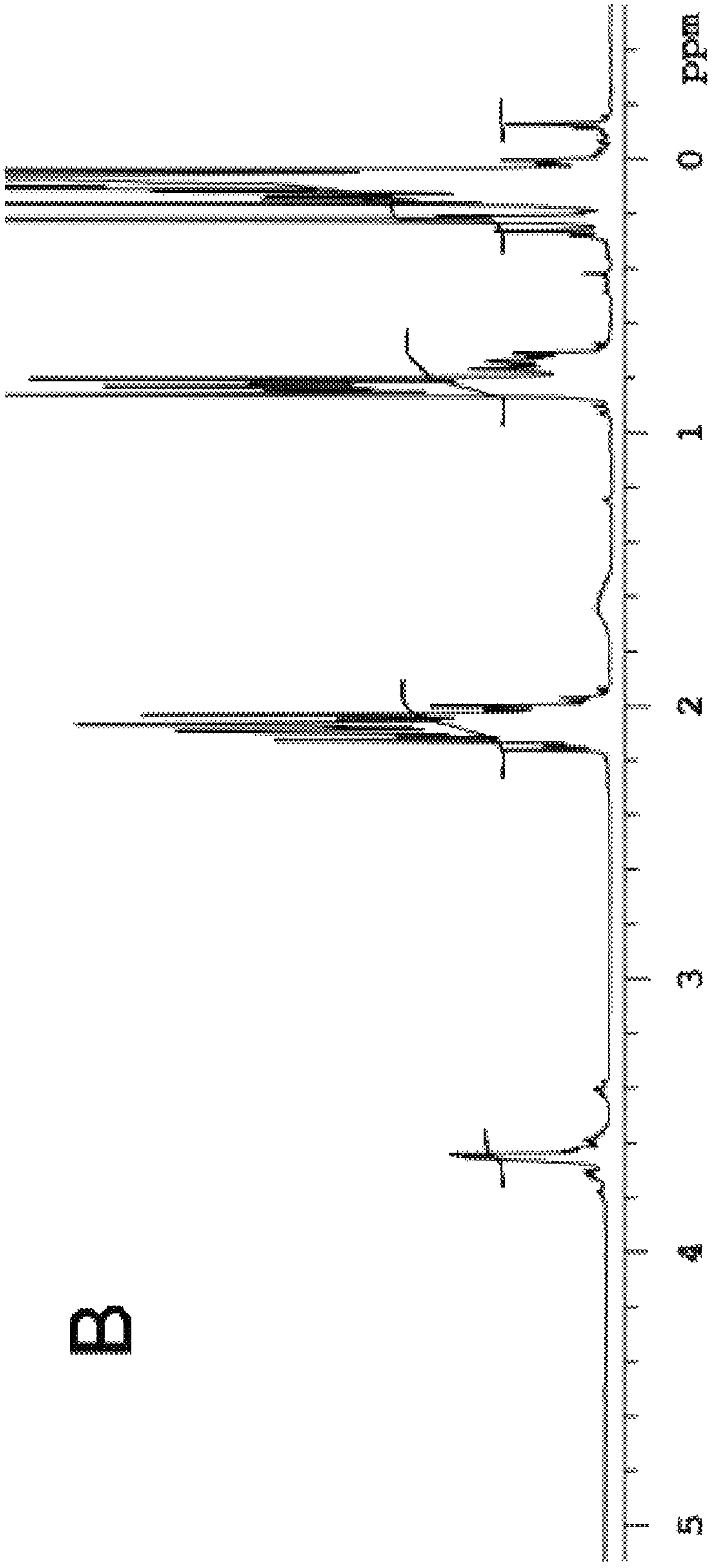

FIG. 9B. $^{1}$HNMR of a 4% (v/v the fluid with surfactant. A single peak that comes from the $CF_3CH_2CH_2$— from the fluorinated fluid. The characteristic signals of the —$(CH_2CH_2$—O)— can be observed at 3.4-3.8 ppm.

Figure 10:
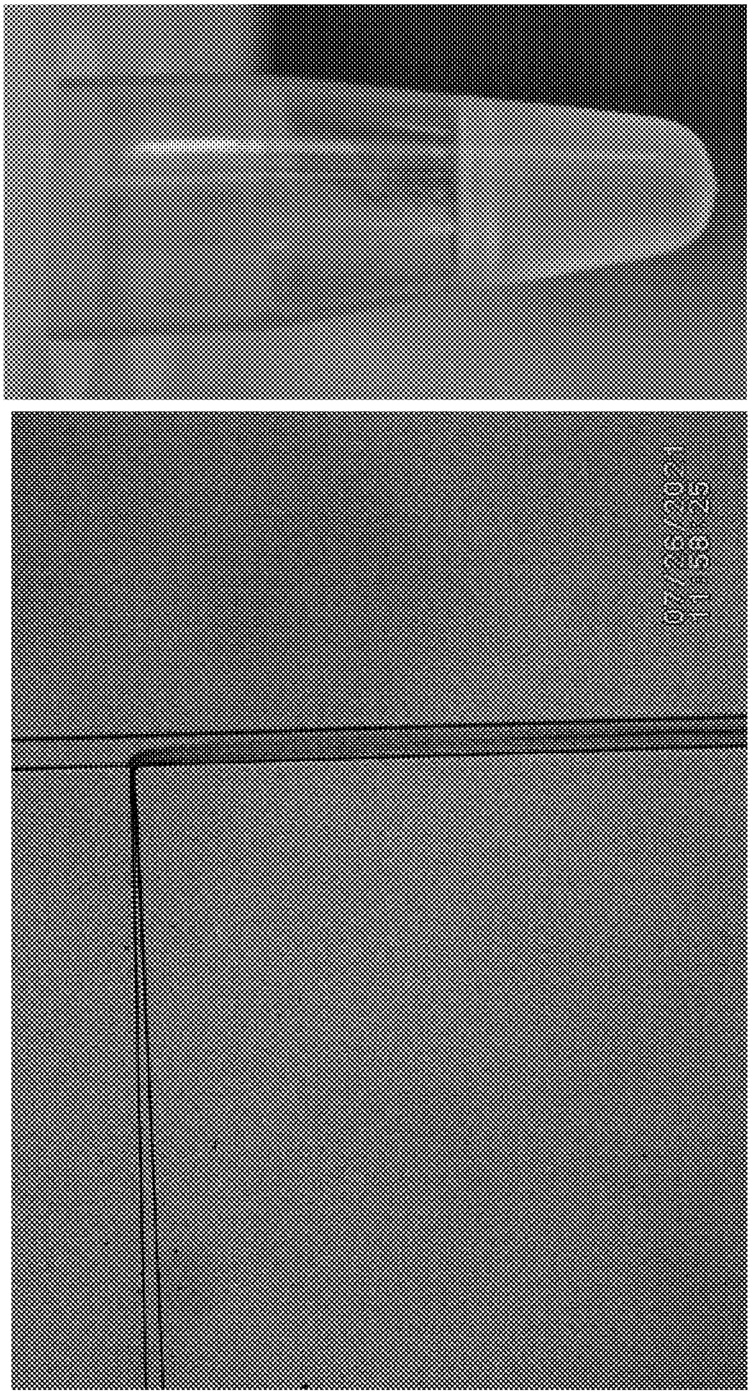

FIG. 10. Droplets made using a microfluidic device (T-junction). (Left) Microscope picture of the T-junction when the droplets are being generated. (Right) Picture of the droplets collected. Conditions: continuous phase was pumped at 3 μL/min; aqueous phase was pumped at 0.5 μL/min. Fluid B (distilled at 150° C., 23 mm Hg) with 2% (v/v) surfactant (FIG. 2).

Figure 11:
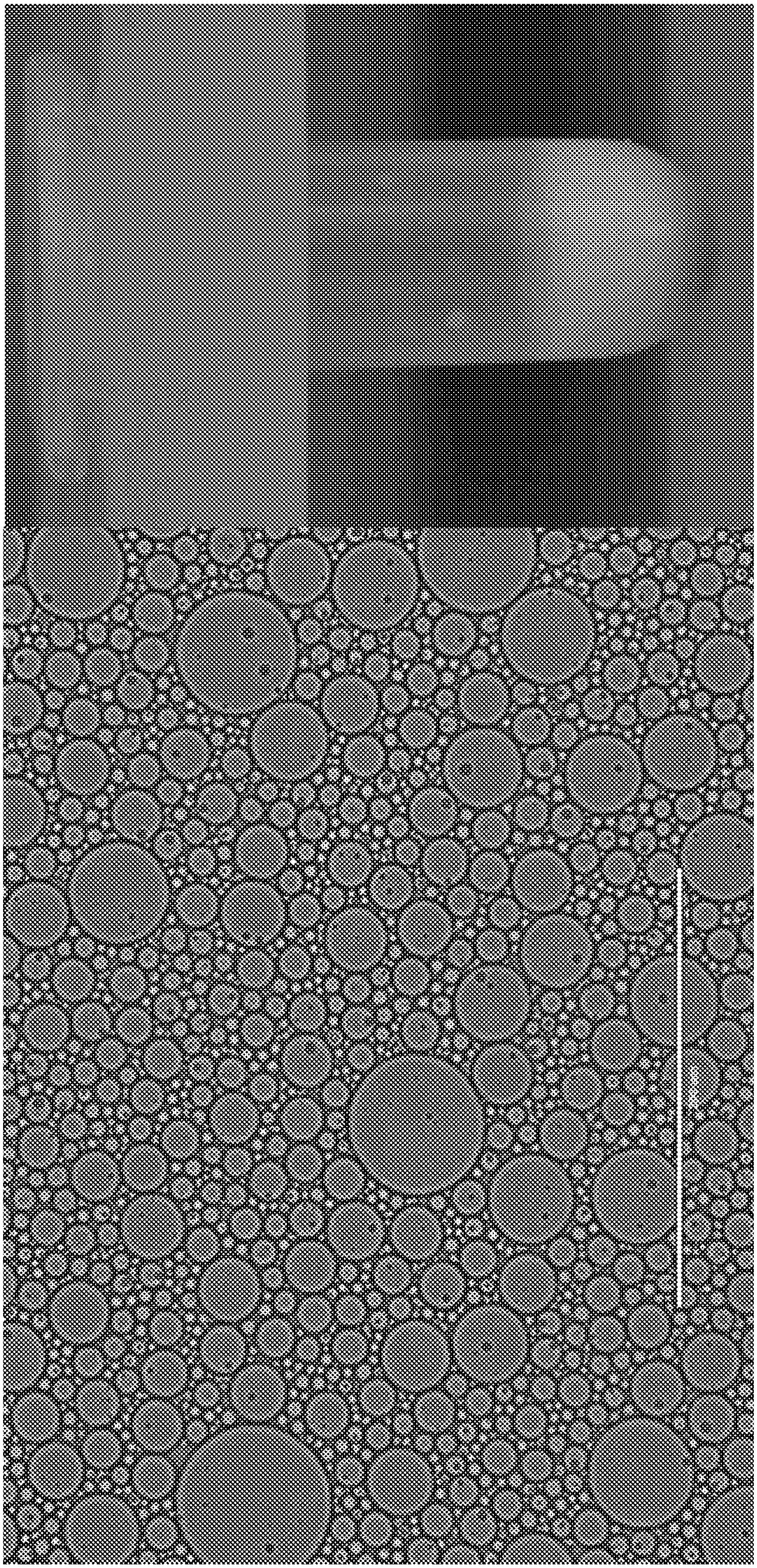

FIG. 11. Emulsion made with fluid C (Example 2). (Left) Transmission microscope image of droplets. The scale bar is 200 μm. (Right) Picture of the emulsion formed by shaking 100 μL of buffer and 300 μL of fluid C with 2% of the surfactant (FIG. 2). The emulsion is formed by shaking the contents in a Snap-Cap Microcentrifuge Biopur™ Safe-Lock™ tube containing a 6 mm stainless steel bead. The tube was fitted in a TissueLyser II and shaken for 10 seconds at 15 Hz followed by 7 seconds at 17 Hz. Pictures are representative of several trials.

Figure 12:
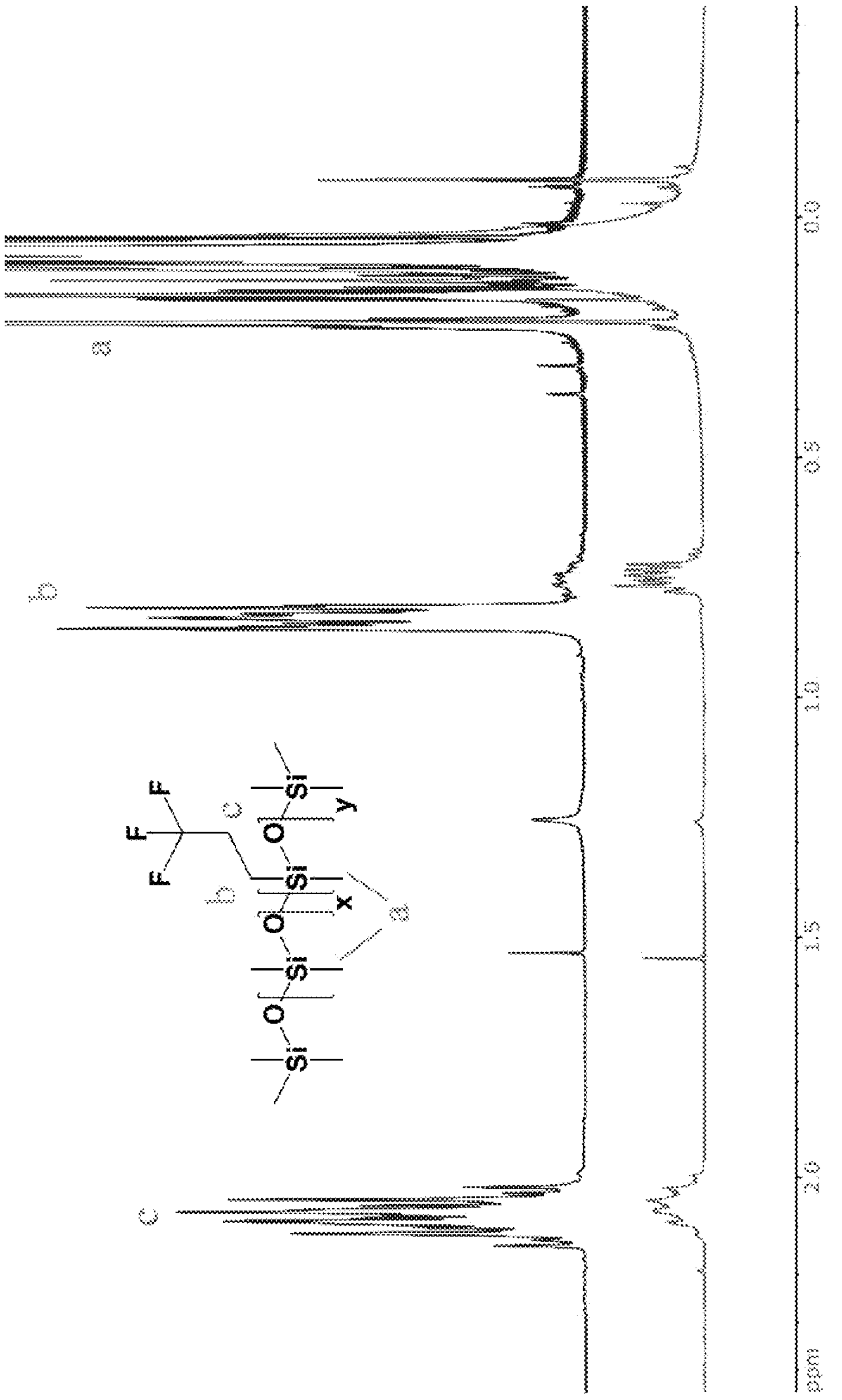

FIG. 12. $^{1}$NMR analysis of fluorosilicone polysiloxanes. Overlay of the $^{1}$HNMR of the low molecular weight (top) and the high molecular weight (bottom) fraction samples indicating the assigned peaks.

Figure 13:
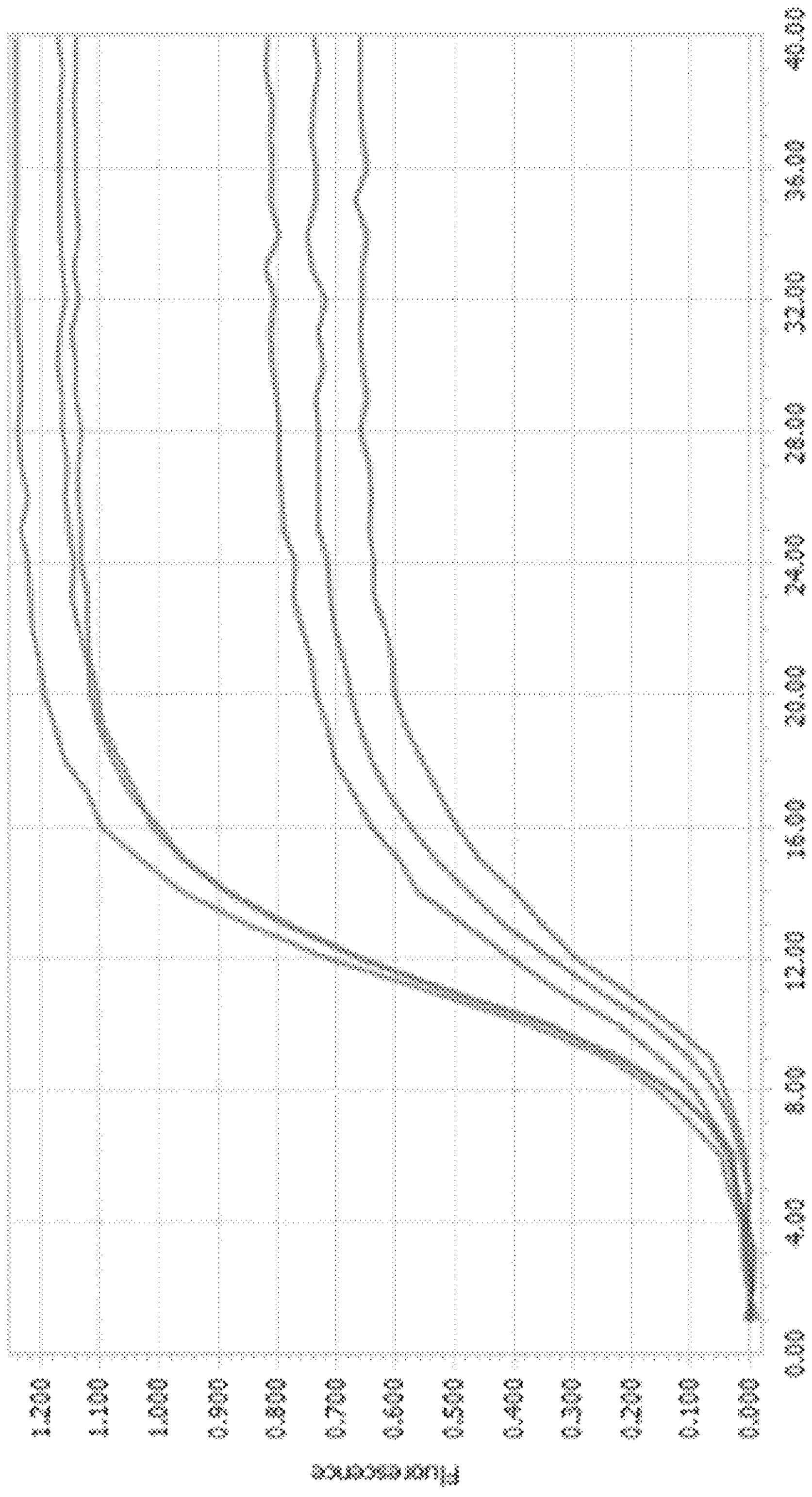

FIG. 13. Real time PCR followed by emergence of fluorescence from intercalated Evagreen® without emulsification in bulk solution (top three lines) and in the emulsified PCR (bottom three lines). The aqueous phase was emulsified by mixing 100 μL of aqueous phase mixed with 300 μL of fluorinated oil (1 volume of LMW fraction and 4 volumes of the HMW fraction, see Example 1) with 2% of surfactant (FIG. 2). Assays were done by triplicate.

Figure 14:
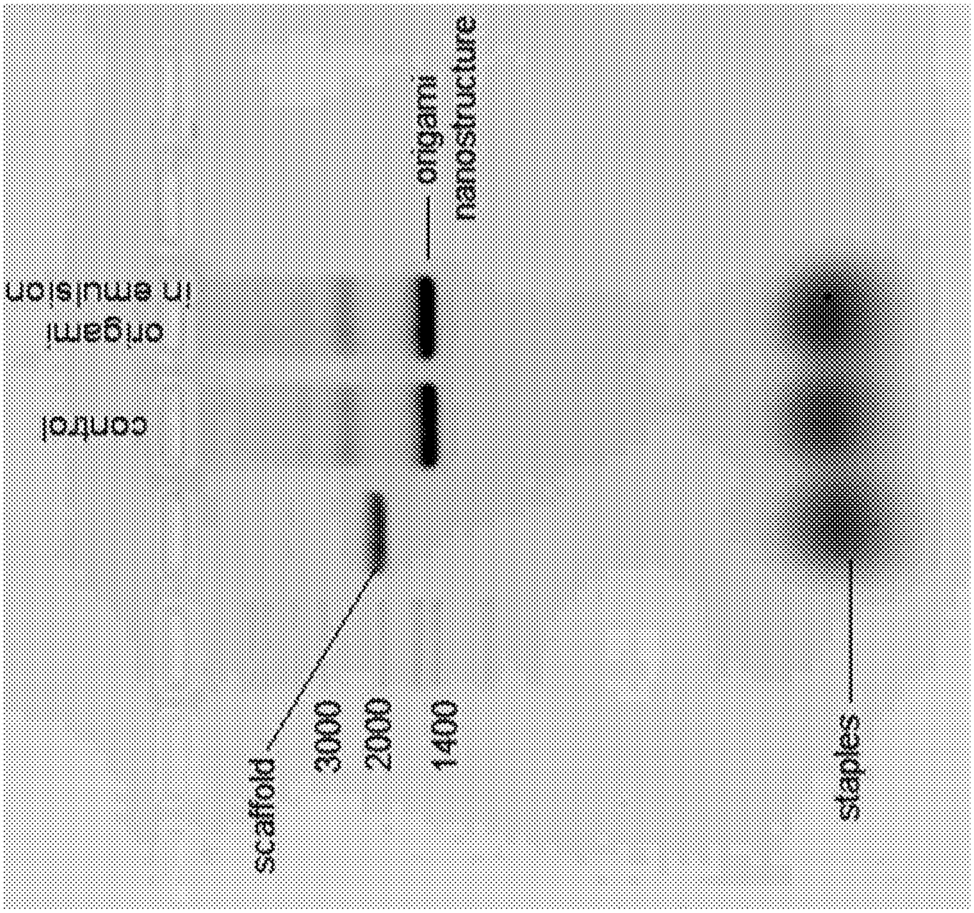

FIG. 14. DNA electrophoresis in agarose (2%) showing the formation of origami structures in droplets. The origami products were run in 0.5×Tris-borate EDTA buffer with ethidium bromide and 6 mM $MgCl_2$. The origami structure folded is called "nanostructure PF-2, cuboid with large aperture" from Tilibit Nanosystems. The scaffold, a single-stranded DNA type p7249 isolated from M13mp18 of length 7,249 bases. The staples are a mixture of 208 oligos [16]. A sample of the mixture of scaffold and staples not annealed is run for comparison. The origami folded properly shows a distinctive migration on the gel. Annealing was done by incubating at 65° C. for 10 minutes then cooled down from 60° C. to 40° C. at a rate of 1° C. per hour.

Figure 15:
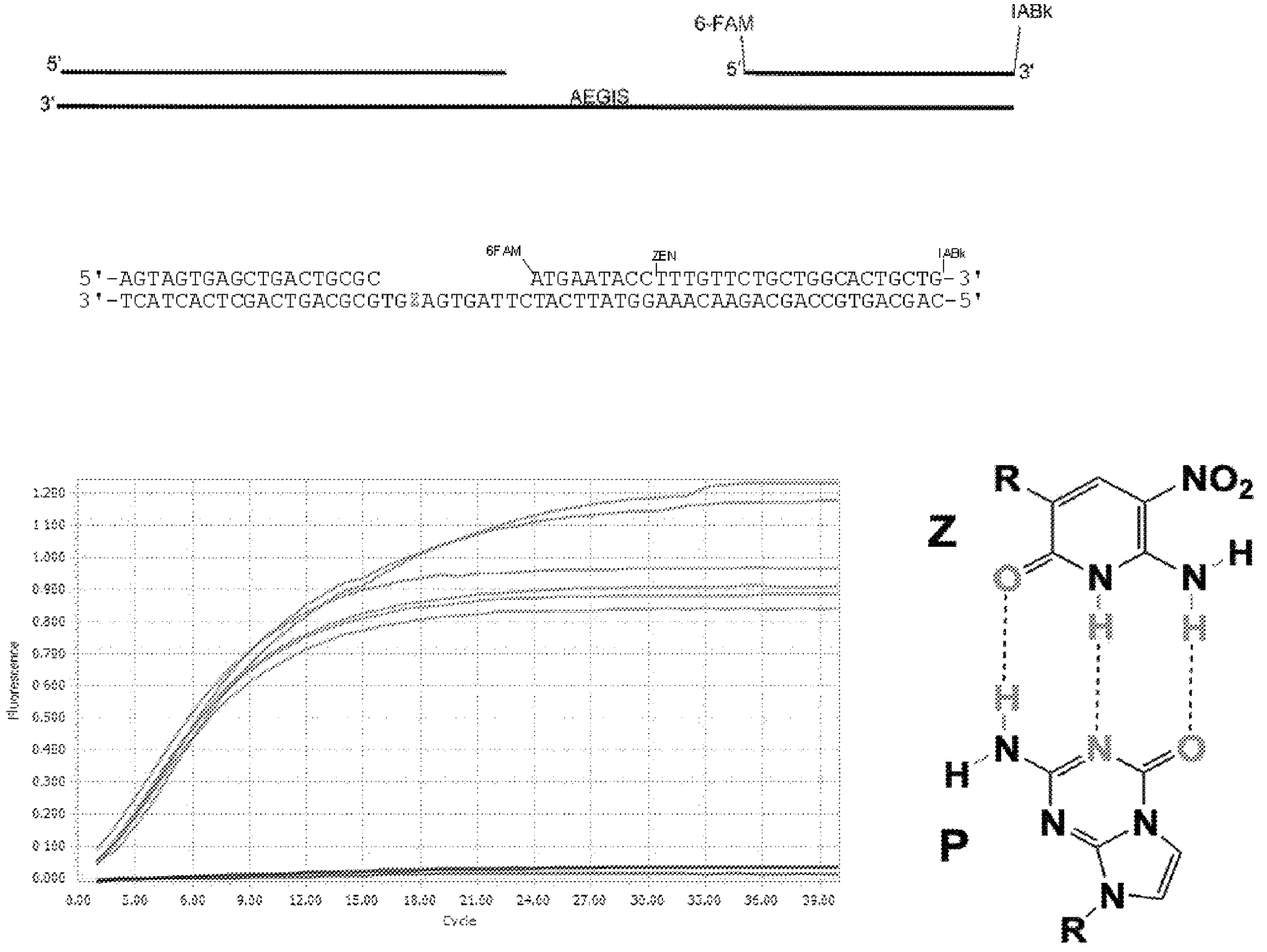

FIG. 15. Taqman® assay in droplets. Top: Scheme of the Taqman® assay containing AEGIS (dZ:dP pair hydrogen bonding shown). Bottom: Real-time fluorescence detected from a probe. The probe contains a 5' fluorophore: 6-carboxyfluorescein (6FAM) and is double-quenched with: 3' Iowa Black™ (IABk) and a proprietary internal ZEN quencher (IDT). When Taq [R587Q E832C] polymerase places a dZ opposite dP and the 5'-3' exonuclease of Taq polymerase cleaves the probe eventually releasing a fluorescent molecule. The blue line is the fluorescence from a non-emulsified reaction. The red line corresponds to the signal from the emulsified reaction. The emulsion was made by mixing 100 μL of aqueous phase with 300 μL of a fluorinated oil with 2% (v/v) fluorinated surfactant. Mixed in QIAGEN TissueLyser II in the presence of a 6 mm stainless steel bead at 15 Hz for 10 seconds followed by 17 Hz for 7 seconds using an Eppendorf Safe-Lock Tube (2 mL) containing a stainless-steel ball. Assays were done by triplicate.

Figure 16:
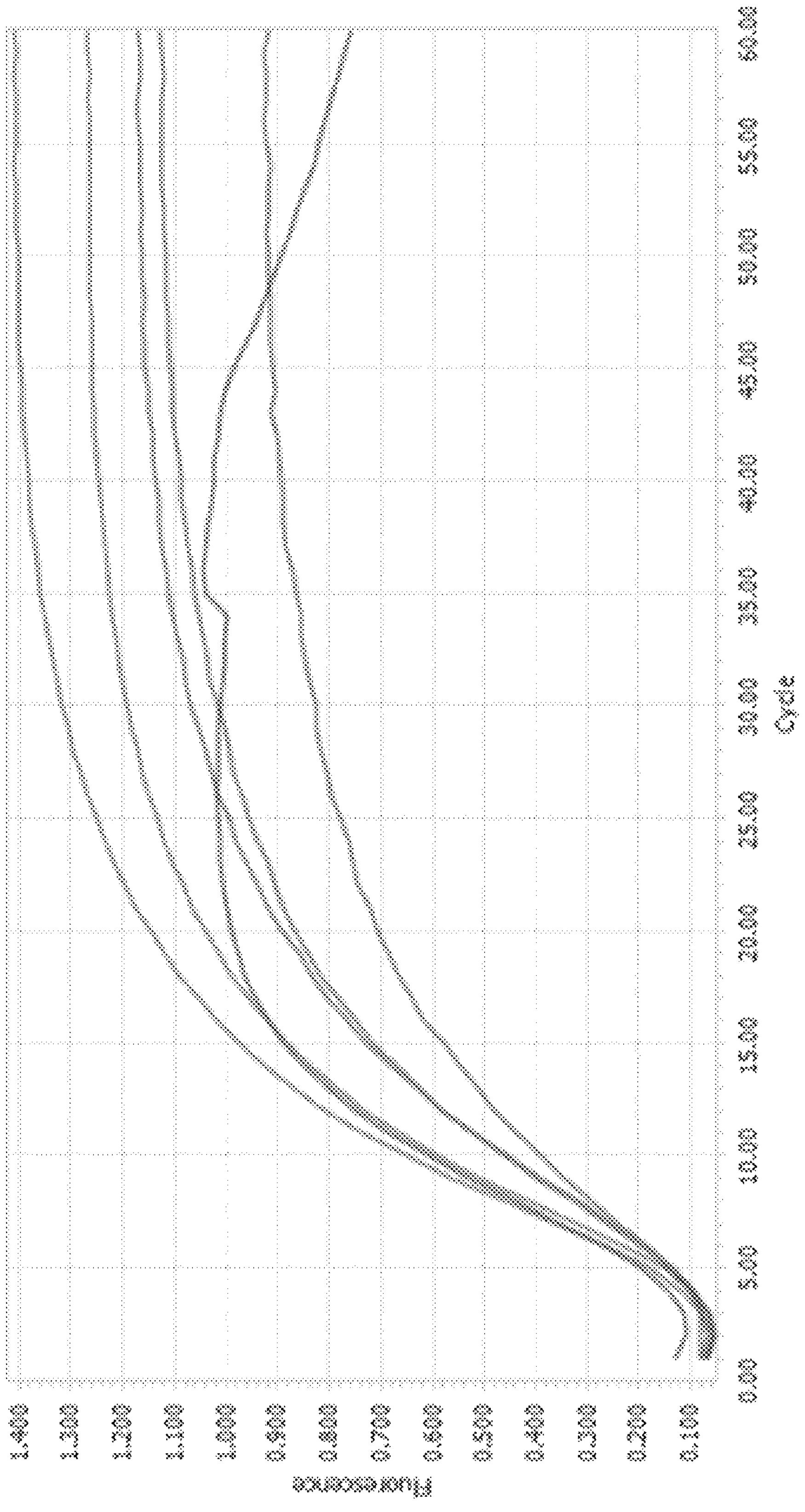

FIG. 16. Amplification curves obtained using the LightCycler96 for RCA amplification in droplets. Fluorescence detection (EvaGreen®) is acquired after each two step cycle [37° C. for 30 seconds-37° C. for 30 seconds followed by aquisition]×60 cycles. Top lines correspond to the reaction that was not emulsified. Bottom lines correspond to the emulsified reaction. Assays done by triplicate.

DETAILED DESCRIPTION OF THE INVENTION

The inventive teaching in this disclosure is that by practicing the instant invention, fluorinated compositions can be obtained that have densities near that of water (~1 gram per milliliter), that have viscosities below 80 cP, can dissolve fluorinated surfactants, and therefore can form phases separate from those dominated by water, by combining a low molecular weight fluid (Fluid B, which distills at approximately 150° C. (at 23 mm Hg), and a high molecular weight fluid (HMW), which remains undistilled.

The art contains examples of material that meet these specifications individually. For example, hexamethyldisiloxane has a low density of 0.764 g/mL, and is less viscous than water. However, it is not fluorinated. HFE-7500 has a low viscosity. However, it has a high density (~1.6 g/mL). The FL-5 fluorinated oil from Shin-Etsu has a low density (0.99 g/cm$^3$), but a high viscosity.

Fluorinated oils of the instant invention preferably have a density of 1.0±0.1 kg/liter, more preferably 1.0±0.05 kg/liter, have a viscosity less than 80 centipoise, more preferably less than 70 centipoise, and can dissolve fluorinated surfactants, preferably to 1-2% w/w.

The fluorinated oils (which are stochastic mixtures of their building block monomeric components) of the instant invention (FIG. 4) are prepared by mixing preselected amounts of these building blocks:

(a) a cyclic fluorinated monomer (exemplified in FIG. 3 as B, with trifluoromethyl groups at the end of a chain with two additional carbon atoms, which is attached to a silicon atom in a 6-ring, where the silicon atom also is attached to a methyl group)

(b) a cyclic nonfluorinated monomer (exemplified in FIG. 3 as structure A, which contains two methyl groups attached to a silicon atom in a 6-ring)

(c) a noncyclic terminating monomer (exemplified in FIG. 3 as structure C, which contains two methyl groups attached to a silicon atom)

The ring opening polymerization that leads to the fluorinated oils of the instant invention generates fluorinated oils that have alternating silicon and oxygen atoms, as in [—Si—O—Si—O—Si—O]—. These silicon atoms come in two forms. In the fluorinated form, the silicon atom is attached to one $—CH_3$ group and one $—CH_2CH_2CF_3$ form. In the non-fluorinated form, the silicon atom is attached to two $—CH_3$ groups. This is shown schematically in FIG. 4. When the polymerization intermediate encounters a terminating group, the polymer becomes terminated with a trimethylsilyl group.

The polymerization process that generates the oils of the instant invention does not control the order of the units, or where/when the termination occurs. Thus, in the structure in FIG. 4, if m=0, the polymer starts on its left end with a fluorinated building block. if w=0, the polymer ends on its right end with a non-fluorinated building block. However, the polymerization process does not control these features. Further, the polymerization process does not generate homogeneous mixtures; all of the molecules in any particular sample of the oil of the instant invention do not have the same number or order of building blocks. However, the relative amounts of the building blocks influences the overall average composition of the material.

To have the utility envisioned here, a fluorinated oil must be able to dissolve useful surfactants. For example, Kobayashi and Owen [2] disclosed surfactants having the structures shown FIG. 1 and FIG. 2. To be useful, these surfactants must dissolve in the fluorinated oil to the aforementioned to 1-2%. The solubility of the surfactants shown in FIG. 1 and FIG. 2 was tested; the test found that do not dissolve in the fluorinated oil from Shin-Etsu know as FL-5, as one example. The surfactants described by Kobayashi and Owen may be soluble in fluorinated oils having densities greater than 1.5 kg/L, and much greater than 1.2 kg/L, such as HF-7500, but these have densities that are too high for the densities targeted by this invention.

Fluorinated oils of the instant invention prepared as described in the examples have a bimodal molecular weight distribution, as assessed by gel permeation chromatography (GPC) profiles; these show two peaks (FIG. 5-7). These fluids can be separated into two major fractions by distillation under reduced pressure. The lower boiling fraction can dissolve up to 4% of surfactant (by volume, FIGS. 8 and 9). The second fraction is recovered from the distillation pot, and has higher measured molecular weight (FIG. 6). The separated fractions are miscible between each other and are combined in the invention to prepare fluids of the desired density or, if desired, viscosity.

Without wishing to be bound by theory, the high molecular weight fraction of the fluorinated oil seems to be important to stabilize water droplets when they are emulsified in the fluorinated oil with surfactants. The most stable emulsions contain both the low molecular weight fraction and the high molecular weight fraction. The low molecular weight fraction helps to solubilize the surfactants and the high molecular weight fraction appears to further stabilizes the emulsion.

One remarkable characteristic of the fluorinated oils disclosed is that when they are prepared following Example 2, the oils spontaneously separate in two layers of different density. Each layer contains a fluid that exhibits bimodal molecular weight distribution (see FIG. 7). This shows that the mixture of high molecular weight and low molecular weight behaves as a single fluid.

The low molecular weight fraction can dissolve up to 4% of surfactant (FIG. 8, FIG. 9). The fluorinated oil of the instant invention (FIG. 4) is prepared by mixing components, as described in Example 1. In the presently preferred embodiment, this viscosity is less than 70 cP, and the density is 1.0±0.05 kg/liter/

EXAMPLES

Example 1. Creation of Fluorinated Fluids of the Instant Invention

The fluorinated monomer (12 g; 25.6 mmol) was weighed in a round bottom flask, taking care that no material stuck to the walls or neck of the reaction flask. The non-fluorinated monomer (72 g; 323.7 mmol) was added second followed by the chain terminator (3 mL; 14.1 mmol) and was heated to 75° C. in an oil bath. Once a homogeneous liquid was formed, Amberlyst® 15 catalyst was added (1.2 g). The reaction proceeded under argon for 3 hours at 75° C.

Volatiles, including unreacted starting materials, were removed by distillation at 90° C. under reduced pressure (23 mm Hg) using a Kugelrohr apparatus. Remaining is Fluid A.

Distillation was continued (23 mm Hg) at 150° C. for 30 and 90 minutes, preferably for 60 minutes. This yielded a volatile material (Fluid B). The residual material left in the pot is high molecular weight (HMW fraction). [16]

Example 2. Another Process to Create Fluorinated Fluids of the Instant Invention The fluorinated monomer 1,3,5 trimethyl 1,3,5-tris(3,3,3-trifluoropropyl) cyclotrisiloxane (25.26 g; 53.9 mmol) was mixed with the non-fluorinated monomer, hexamethylcyclotrisiloxane (36 g; 161.8 mmol) and hexamethyl disiloxane (2.8 mL; 13.11 mmol). The mixture was heated to 75° C. in an oil bath. Catalyst Amberlyst® 15 (1.2 g) was added last, after the mixture was homogeneous. The reaction proceeded under argon for 4 hours at 75° C. Then, the opaque liquid in the reaction vessel was decanted to separate it from the solid catalyst. Kugelrohr distillation of the liquid (90° C., 23 mm Hg) removed unreacted starting materials. This remaining fluid was left at room temperature for 8 hours, after which it had separated into two layers each with different characteristics (top layer: fluid C; bottom layer: fluid D). [16]

Example 3. Analyses of Fluorinated Fluids: Density, Viscosity and Polydispersity Cambridge Polymer Group (CPG) performed the analysis of the physical properties of the instantly claimed fluorinated oils. The characterization of chain length was done using GPC, and comparing the elution of the samples relative to polystyrene standards used for calibration. The molecular weight of this kind of analysis is reported as Mw, Mn and Mz. Briefly, Mw takes in account the contribution to the weight by each fraction of the sample. Larger molecules contribute more to the Mw. The ratio of Mw/Mn is the polydispersity. The molecular weight distribution overlay shown on FIGS. 5, 6, and 7 shows samples with different polydispersity.

TABLE 1

Summary of molecular weight moments and polydispersity.

| Sample | Mp [g/mol] | Mn [g/mol] | Mw [g/mol] | PDI |
|---|---|---|---|---|
| Fluid A | 9404 ± 57.7 | 1748 ± 31.2 | 10126 ± 83.5 | 5.793 ± 0.058 |
| Fluid A peak 1 | 10321 ± 34.6 | 3206 ± 486 | 11478 ± 74.0 | 3.637 ± 0.561 |
| Fluid A peak 2 | 321 ± 2.08 | 230 ± 2.65 | 305 ± 2.00 | 1.326 ± 0.008 |
| Fluid C | 6412 ± 64 | 2064 ± 11 | 6266 ± 116 | 3.04 ± 0.06 |
| Fluid C peak 1 | 6412 ± 64 | 4549 ± 34 | 7529 ± 144 | 1.66 ± 0.019 |
| Fluid C peak 2 | 626 ± 6 | 597 ± 3 | 637 ± 3 | 1.07 ± 0.008 |
| Fluid D | 645 ± 4 | 1722 ± 12 | 6543 ± 119 | 3.80 ± 0.07 |
| Fluid D peak 1 | 7178 ± 47 | 4892 ± 23 | 8522 ± 70 | 1.74 ± 0.009 |
| Fluid D peak 2 | 645 ± 4 | 611 ± 4 | 661 ± 4 | 1.08 ± 0.003 |

Reported molecular weight moments and polydispersity measured from the overall chromatogram, as average±one standard deviation. Molecular weights were reported in polystyrene equivalents. Fluid A peak 1 (FIG. 5-7) was named high molecular weight fraction (HMW); Fluid A peak 2 referred was named low molecular weight fraction (LMW). $Mn=\Sigma M_i N_i/\Sigma N_i$, where Mn is the number molecular weight; $M_i$ is the molecular weight of a chain and $N_i$ is the number of chains of that molecular weight. $Mw=\Sigma M_i^2 N_i/\Sigma M_i N_i$, where Mw is the weight average molecular weight. In this molecular weight value the more massive chains contribute more to the molecular weight average. PDI is the polydispersity index. PDI=Mw/Mn.

TABLE 2

Viscosity, density and other properties measured on fluorinated polysiloxane

| sample | density (g/mL) | Viscosity (cSt) | $^1$HNMR β-$CH_2$ integral | $^1$HNMR Si—$CH_3$ integral | MW (g/mol) | PDI | non-fluorinated:fluorinated monomer |
|---|---|---|---|---|---|---|---|
| Fluid A peak 2 | 1.031 | n/d | 2 | 18.3 | 305 | 1.3 | 2.55:1 |
| Fluid A peak 1 | 1.0565 | n/d | 2 | 96.3 | 11478 | 3.6 | 15.55:1 |
| HMW fluid | 0.986 | 67 | 2 | 58.0 | 10126 | 5.8 | 9.17:1 |
| Fluid C | 1.0457 | 6.06 | 2 | 33.98 | 6266 | 3.04 | 5.16:1 |
| Fluid D | 1.1347 | 10.8 | 2 | 12.24 | 6543 | 3.8 | 1.54:1 |
| Fluid B * | 1.1397 | 4.5 | 2 | 11.48 | n/d | n/d | 1.41:1 |

Fluid B * was prepared following Example 1 but with a shorter time of reaction obtaining a fluid with lower viscosity but with higher density and higher proportion of fluorinated monomers.

Example 4. Mixing Fluids to Get Fluids Having the Density of the Instant Invention Four volumes of HMW fraction and 1 volume of fluid B were combined to obtain a fluid with density close to 1 g/mL. These fluids were made as described in Example 1.

Example 5. Use of the Fluids for Six-Nucleotide PCR with Artificially Expanded Genetic Information Systems (AEGIS)

These are reported in Laos R, Benner S. (2022) *PLOS ONE* 17(1): e0252361, which appeared after the priority date of this filing. The text, abstract, figures and references of this publication are incorporated herein in their entirety.

An aqueous solution holding all components required for a PCR was prepared, consisting of: (a) primers (20 nM each)

SEQ ID NO 1
5'-GACGGACTGCCTATGAG-3

SEQ ID NO 2
5'-GAGGCGATCGCAGTATC-3'

(b) double stranded template ($2\times10^{-7}$ μM):

SEQ ID NO 3
5'-GACGGACTGCCTATGAGCAGTTZAAAAGZTATGATACTGCGATCGCC
TC-3'

SEQ ID NO 4
5'-GAGGCGATCGCAGTATCATAPCTTTTPAACTGCTCATAGGCAGTCCG
TC-3'

(c) substrates, dNTPs, dZTP, and dPTP (0.2 mM each), (d) Evagreen 2×; (e) a variant of Taq DNA polymerase fused to the DNA binding protein of *Sulfolobus solfactaricus* Sso7d-Taq(Δ1-280) [R587Q E626K I707L E708K A743H E832G]) at $7.1\times10^{-2}$ M; and (f) buffer, with 20 mM Tris-HCl, pH 8.4; 10 mM $(NH_4)_2SO_4$; 10 mM KCl; 2 mM $MgSO_4$; 0.1% Triton® X-100.

The PCR mixture (100 μL) was emulsified along with 300 μL of a fluorinated fluid with density 1.009 g/mL that contained 2% (v/v) surfactant (FIG. 2). The fluid was prepared by mixing 1 mL of fluid B with 4 mL of the HMW fluid (Example 1). The mixture of two phases was placed in a Safe-Lock Tube with and a 6 mm stainless steel bead. The tube was then fitted in a 96-well storage plate and secured between the top and bottom plates of TissueLyser II (QIAGEN). The components were then mixed for 10 seconds at 15 Hz followed by 7 seconds at 17 Hz. Then, 50 μL of emulsion were transferred to PCR tubes with an optical lid by triplicate. The PCR used the following cycle: 92° C. for 30 seconds 40 cycles: [92° C. for 10 seconds; 48° C. for 15 seconds; 72° C. for 20 seconds] and acquired fluorescence after each cycle using a Lightcycler® 96 (Roche Life Science). [16]

Example 6. Use of the Fluids for Taqman® Assay in Droplets

An aqueous solution containing the components of a Taqman® assay reaction was prepared to contain:

Template at 0.4 μM concentration:

SEQ ID NO 5
```
5'-CAGCAGTGCCAGCAGAACAAAGGTATTCATCTTAGTGAPGTGCGC

AGTCAGCTCACTACT-3'
```

Primer at 0.2 μM concentration:

SEQ ID NO 6
```
5'-AGTAGTGAGCTGACTGCGC-3'
```

Probe, which has a fluorescent FAM fluor is added to the 5'-end, a proprietary ZEN quencher is added between ACC and TTT, and an IABkFQ quencher is added at the 3'-end; all of these are commercially available from Integrated DNA Technologies.

SEQ ID NO 7
```
5'-ATGAATACCTTTGTTCTCTGCTGGCAACTGCTG-3'
```

The other components of the reaction mixture were: (a) substrate dNTPs and dZTP, each at 0.2 mM; (b) buffer at 10 mM Tris pH 8.3, 1.5 mM $MgCl_2$, 50 mM KCl; and (c) enzyme, a variant of Taq DNA polymerase [R587Q, E832C], 6 pmol/50 μL reaction.

The aqueous mixture (100 μL) was emulsified along with 300 μL of a fluorinated fluid with density 1.009 g/mL that contained 2% (v/v) surfactant (FIG. 2). The fluid was prepared by mixing 1 mL of fluid B with 4 mL of the HMW fluid (Example 1). The tube containing the two phases was then fitted in a 96-well storage plate and secured between the top and bottom plates of TissueLyser II (QIAGEN). The components were then mixed for 10 seconds at 15 Hz followed by 7 seconds at 17 Hz. Then, 50 μL of emulsion were transferred to PCR tubes with an optically clear lid and placed in the following cycle: 40 cycles of: [95° C. for 8 seconds; 62° C. for 24 seconds] and acquired fluorescence after each cycle using a Lightcycler® 96 (Roche Life Science).

Example 7. Use of the Fluids for Rolling Circle Amplification (RCA) in Droplets

An aqueous mixture comprising all of the components for a RCA reaction was prepared to include: 1×Phi29 buffer (New England Biolabs), which has 50 mM Tris-HCl at pH 7.5, 10 mM $MgCl_2$, 10 mM $(NH_4)_2SO_4$, and 4 mM DTT (@25° C.); (b) triphosphates, dATP, dCTP, dTTP, dGTP, 0.2 mM each; polymerase, Phi29 0.1 U/μL, with BSA 0.2 μg/μL; circular ssDNA template molecule at 2.5 μg/μL, and primer at 0.8 μM, having the sequence:

SEQ ID NO 8
```
5'-CAGGGCTGGGCATAGAAGTCAGGGCAGA-3'
```

The circular ssDNA template was prepared by circularizing 5'-phosphorylated:

SEQ ID NO 9
```
5'-TATGCCCAGCCCTGTAAGATGAAGATAGCGCACAATGGT

CGGATTCTCAACTCGTATTCTCAACTCGTATTCTCAA

CTCGTCTCTGCCCTGACTTC-3'
```

with CircLigase™ (Lucigen) according to the manufacturer protocol. Non-circularized material was degraded with Exonuclease I (*E. coli*) according to the manufacturer protocol as well. The aqueous mixture holding all the components necessary for RCA was emulsified by placing aqueous mixture (100 μL) along with 300 μL of a fluorinated fluid with density 1.009 g/mL that contained 2% (v/v) surfactant (FIG. 2). The fluid was prepared by mixing 1 mL of fluid B with 4 mL of the HMW fluid (Example 1). The tube containing the two phases was then fitted in a 96-well storage plate and secured between the top and bottom plates of TissueLyser II (QIAGEN). The components were then mixed for 10 seconds at 15 Hz followed by 7 seconds at 17 Hz. Then, 50 μL of emulsion were transferred by triplicate to PCR tubes with an optically clear lid. Fluorescence was acquired after each minute using a Lightcycler® 96 (Roche Life Science). [16]

Example 8. Ring-Opening Polymerization

Acid-catalyzed ring-opening polymerization following Example 1, produced polysiloxanes with bimodal molecular weight distribution (FIG. 5). Example 2 produced two fluids with different densities which spontaneously separated. Interestingly, each of these fluids exhibits a bimodal molecular weight distribution as well (FIG. 7). Following Example 1, fluid A was separated by distillation using a Kugelrohr apparatus. Obtaining 15 mL of the lower molecular weight fraction (150° C., 23 mm Hg) with a density of 1.0565 g/mL. The remaining fluid (~53 mL) consists of a high molecular weight fraction with density 1.031 g/mL; this remained undistilled up to 200° C. at 23 mm Hg). Table 1 lists molecular weight values for different fractions. Table 2 lists values of viscosity and density.

REFERENCES

[1] Clausell-Tormos J., Lieber D., Baret J.-C., El-Harrak A., Miller O. J., Frenz, L. Blouwolff J., Humphry K. J., Koester S., Duan H., Holtze C., Weitz D. A., Griffiths A. D. and Merten C. A., (2008) *Chem. Biol.,* 15, 427-437

[2] Paegel B. M, Joyce G. F., (2010) *Chemistry & Biology,* 17, 7, 717-724

[3] Seo, D. (2007) *Nanofluidics,* 10, 59-67

[4] Weng, L. (2019) *SLAS Technology,* 24, 373-385

[5] Thapa, S. & Heo, Y. S. *JMST Adv.* (2019)

[6] www.shinetsusilicones.com/modified_fluids_detail.html?mol block=fluoroalkyl-modified Retrieved on Jun. 7, 2022

[7] Kobayashi, H., Owen, M. J. (1993), *Journal of Colloid and Interface Science,* 156, 415-419.

[8] Thorsen, T. (2001) *Physical Review Letters,* 86, 4163

[9] Holtze, C. (2008) *Lab on a Chip,* 8, 1632-1639

[10] Fidalgo L. M., Abell C. and Huck W. T. S., *Lab Chip* (2007), 7, 984-986

[11] Marcoux P., Dupoy M., Mathey R., Novelli-Rousseau A., Heran V., Morales, S. Rivera F., Joly P., Moy J. and Mallard F., (2011) *Colloids Surf, A,* 377, 54-62

[12] Schonbrun E., Abate A. R., Steinvurzel P. E., Weitz D. A. and Crozier K. B., (2010) *Lab Chip,* 10, 852-856
[13] Abate A. R. and Weitz D. A., (2009) *Small,* 5, 2030-2032
[14] Mazutis L., Araghi A. F., Miller O. J., Baret J.-C., Frenz L., Janoshazi A., Taly V., Miller B. J., Hutchison J. B., Link D., Griffiths A. D. and Ryckelynck, M. (2009) *Anal. Chem.,* 81, 4813-4821
[15] Granieri L., Baret J.-C., Griffiths A. D. and Merten C. A., *Chem. Biol.,* 2010, 17, 229-235
[16] Laos R, Benner S. (2022) *PLOS ONE* 17(1): e0252361. https://doi.org/10.1371/journal.pone.0252361

What is claimed is:

1. A fluid comprising molecules containing carbon, hydrogen, oxygen, silicon and fluorine, wherein said fluid has (i) a density between 0.95 and 1.05 grams/milliliter at 25° C. under 1 atmosphere of pressure, (ii) a viscosity less than 80 centistokes, and (iii) wherein said molecules show molecular weight distributions as measured by gel permeation chromatography centered near 300 and 10,000 grams/mol.

2. The fluid of claim 1, where said fluid has a density between 0.97 and 1.03 grams/milliliter at 25° C. under 1 atmosphere of pressure.

3. The fluid of claim 1, where said fluid has a viscosity less than 70 centistokes.

4. A composition of matter comprising a fluid comprising molecules containing carbon, hydrogen, oxygen, silicon and fluorine, wherein said fluid has (i) a density between 0.95 and 1.05 grams/milliliter at 25° C. under 1 atmosphere of pressure, (ii) a viscosity less than 80 centistokes, and wherein the molecules in said fluid show molecular weight distributions as measured by gel permeation chromatography centered near 300 and 10,000 grams/mol, and wherein said fluid further comprises a surfactant selected from one or more of the group consisting of

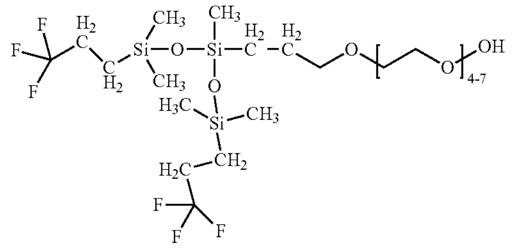

and

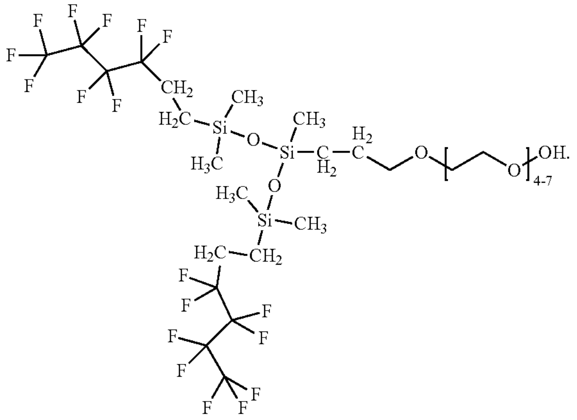

* * * * *

SEQUENCE LISTING

<160> NUMBER OF SEQ ID NOS: 9

<210> SEQ ID NO 1
<211> LENGTH: 17
<212> TYPE: DNA
<213> ORGANISM: Artificial Sequence
<220> FEATURE:
<223> OTHER INFORMATION: synthetic construct

<400> SEQUENCE: 1
gacggactgc ctatgag 17

<210> SEQ ID NO 2
<211> LENGTH: 17
<212> TYPE: DNA
<213> ORGANISM: Artificial Sequence
<220> FEATURE:
<223> OTHER INFORMATION: synthetic construct

<400> SEQUENCE: 2
gaggcgatcg cagtatc 17

<210> SEQ ID NO 3
<211> LENGTH: 49
<212> TYPE: DNA
<213> ORGANISM: Artificial Sequence
<220> FEATURE:
<223> OTHER INFORMATION: synthetic construct
<220> FEATURE:
<221> NAME/KEY: misc_feature
<222> LOCATION: (23)..(23)
<223> OTHER INFORMATION: 6-amino-3-(2'-deoxy)-D-ribofuranosyl)-5-nitro-1H-pyridin-2-one
<220> FEATURE:
<221> NAME/KEY: misc_feature
<222> LOCATION: (29)..(29)
<223> OTHER INFORMATION: 6-amino-3-(2'-deoxy)-D-ribofuranosyl)-5-nitro-1H-pyridin-2-one

<400> SEQUENCE: 3
gacggactgc ctatgagcag ttnaaaagnt atgatactgc gatcgcctc 49

<210> SEQ ID NO 4
<211> LENGTH: 49
<212> TYPE: DNA
<213> ORGANISM: Artificial Sequence
<220> FEATURE:
<223> OTHER INFORMATION: synthetic construct
<220> FEATURE:
<221> NAME/KEY: misc_feature
<222> LOCATION: (21)..(21)
<223> OTHER INFORMATION: 2-amino-8-(1'-beta-D-2'-deoxyribofuranosyl)-imidazo[1,2a]-1,3,5-triazin-4(8H)-one
<220> FEATURE:
<221> NAME/KEY: misc_feature
<222> LOCATION: (27)..(27)
<223> OTHER INFORMATION: 2-amino-8-(1'-beta-D-2'-deoxyribofuranosyl)-imidazo[1,2a]-1,3,5-triazin-4(8H)-one

<400> SEQUENCE: 4
gaggcgatcg cagtatcata ncttttnaac tgctcatagg cagtccgtc 49

-continued

<210> SEQ ID NO 5
<211> LENGTH: 60
<212> TYPE: DNA
<213> ORGANISM: Artificial Sequence
<220> FEATURE:
<223> OTHER INFORMATION: synthetic construct
<220> FEATURE:
<221> NAME/KEY: misc_feature
<222> LOCATION: (39)..(39)
<223> OTHER INFORMATION: 2-amino-8-(1'-beta-D-2'-deoxyribofuranosyl)-
imidazo[1,2a]-1,3,5-triazin-4(8H)-one

<400> SEQUENCE: 5
cagcagtgcc agcagaacaa aggtattcat cttagtgang tgcgcagtca gctcactact 60

<210> SEQ ID NO 6
<211> LENGTH: 19
<212> TYPE: DNA
<213> ORGANISM: Artificial Sequence
<220> FEATURE:
<223> OTHER INFORMATION: synthetic construct

<400> SEQUENCE: 6
agtagtgagc tgactgcgc 19

<210> SEQ ID NO 7
<211> LENGTH: 33
<212> TYPE: DNA
<213> ORGANISM: Artificial Sequence
<220> FEATURE:
<223> OTHER INFORMATION: synthetic construct

<400> SEQUENCE: 7
atgaatacct ttgttctctg ctggcaactg ctg 33

<210> SEQ ID NO 8
<211> LENGTH: 28
<212> TYPE: DNA
<213> ORGANISM: Artificial Sequence
<220> FEATURE:
<223> OTHER INFORMATION: synthetic construct

<400> SEQUENCE: 8
cagggctggg catagaagtc agggcaga 28

<210> SEQ ID NO 9
<211> LENGTH: 96
<212> TYPE: DNA
<213> ORGANISM: Artificial Sequence
<220> FEATURE:
<223> OTHER INFORMATION: synthetic construct

<400> SEQUENCE: 9
tatgcccagc cctgtaagat gaagatagcg cacaatggtc ggattctcaa ctcgtattct 60
caactcgtat tctcaactcg tctctgccct gacttc 96